(12) United States Patent
Li

(10) Patent No.: US 10,183,187 B2
(45) Date of Patent: Jan. 22, 2019

(54) CATALYST FOR DISINFECTION, STERILIZATION AND PURIFICATION OF AIR, AND PREPARATION METHOD THEREOF

(71) Applicant: Shenzhen Kangfeng Environmental Technology Development Co., Ltd., Shenzhen, Guangdong (CN)

(72) Inventor: Guopei Li, Guangdong (CN)

(73) Assignee: Shenzhen Kangfeng Environmental Technology Development Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/554,020

(22) PCT Filed: Mar. 8, 2016

(86) PCT No.: PCT/CN2016/075854
§ 371 (c)(1),
(2) Date: Aug. 28, 2017

(87) PCT Pub. No.: WO2017/117861
PCT Pub. Date: Jul. 13, 2017

(65) Prior Publication Data
US 2018/0021613 A1    Jan. 25, 2018

(30) Foreign Application Priority Data

Jan. 9, 2016    (CN) .......................... 2016 1 0010790
Jan. 9, 2016    (CN) ..................... 2016 2 0015227 U

(51) Int. Cl.
| A62D 3/176 | (2007.01) |
| B01D 53/86 | (2006.01) |
| B01J 27/10 | (2006.01) |
| B01J 32/00 | (2006.01) |

(52) U.S. Cl.
CPC ............. *A62D 3/176* (2013.01); *B01D 53/86* (2013.01); *B01D 53/8687* (2013.01); *B01J 27/10* (2013.01); *B01J 32/00* (2013.01); *B01D 2251/11* (2013.01); *B01D 2255/2022* (2013.01); *B01D 2255/2025* (2013.01); *B01D 2255/2027* (2013.01); *B01D 2255/30* (2013.01); *B01D 2255/40* (2013.01); *B01D 2255/50* (2013.01); *B01D 2255/70* (2013.01); *B01D 2255/802* (2013.01); *B01D 2257/708* (2013.01); *B01D 2257/91* (2013.01); *B01D 2258/06* (2013.01)

(58) Field of Classification Search
CPC ... A61L 9/00; A61L 9/014; A61L 9/04; A61L 9/12; A61L 9/16; A61L 9/18; A61L 9/20; A61L 9/205; A61L 9/22; A61L 2209/00; A61L 2209/21; A61L 2209/212; A61L 2209/22; B01L 15/00; B01L 20/02; B01J 20/32; B01J 21/00; B01J 23/00; B01J 29/00; B01J 37/0201; B01J 37/34; B01J 2219/00936; B01D 2255/00; B01D 2257/91; B01D 2257/70; B01D 2257/704; B01D 2258/06; B01D 2259/4508; B01D 2259/804

See application file for complete search history.

(56) References Cited

U.S. PATENT DOCUMENTS

| 4,604,110 A * | 8/1986 | Frazier ...................... A61L 9/00 422/122 |
| 8,652,411 B2 * | 2/2014 | Taguchi ................... A61L 9/015 422/186.3 |
| 2005/0079124 A1 * | 4/2005 | Sanderson .............. A61L 9/145 423/477 |
| 2005/0233900 A1 * | 10/2005 | Smith ..................... A01N 59/00 502/407 |
| 2009/0148342 A1 * | 6/2009 | Bromberg .............. A01N 59/00 422/37 |
| 2012/0225135 A1 * | 9/2012 | Krogulec ................ A01N 59/00 424/661 |
| 2013/0034473 A1 * | 2/2013 | Taguchi ................... A61L 9/015 422/186.3 |

FOREIGN PATENT DOCUMENTS

| CN | 1775347 | 5/2006 |
| CN | 101554486 | 10/2009 |

(Continued)

OTHER PUBLICATIONS

International Search Report of PCT/CN2016/075854 dated Oct. 26, 2016, 4 pages (English and Chinese).

(Continued)

*Primary Examiner* — Timothy C Vanoy
(74) *Attorney, Agent, or Firm* — Rankin Hill & Clark LLP

(57) ABSTRACT

A method of utilizing a catalyst for the sterilization, disinfection and purification of indoor air. The catalyst carrier is made of inorganic porous material such as Silica, Zeolite, Diatomite, Sepiolite, Montmoroillonite, and Aluminum oxide. The catalyst carrier can also be made of Cordierite, or Mullite ceramic honeycomb. After dipping into stabilized sodium hypochlorite solution or stabilized chlorine dioxide solution, the catalyst is produced after dehydration. The catalyst is irradiated with ultraviolet lamp to generate gas-phase free radicals including reactive particles such as .OH, .ClO2, .HO2, .O, thereby sterilizing microbial air pollutants such as viruses, bacteria, fungi and other microorganisms, and remove chemical air pollutants such as formaldehyde.

15 Claims, 2 Drawing Sheets

(56) References Cited

FOREIGN PATENT DOCUMENTS

| | | | | |
|---|---|---|---|---|
| CN | 204853699 | | 12/2015 | |
| CN | 204853699 U | * | 12/2015 | ............... F24F 1/00 |
| JP | 2004050131 A | * | 2/2004 | ............... A61L 2/20 |
| KR | 2017 072731 A | * | 6/2017 | |

OTHER PUBLICATIONS

Cheng, J.: "Experimental Study on the Removal of Formaldehyde", Science-Engineering (A), China's Masters Theses Full-Text Database, No. 7, Apr. 10, 2015 (Abstract Only) http://oversea.cnki.net.

Cui, C., et al: "Research on Photochemical Decomposition of Gaseous Chlorine Dioxide", China Safety Science Journal Zhongguo Anquan Kexue Xuebao 2011, Issue 7, pp. 52-56. http://caod.oriprobe.com/articles/27562985/Research_on_Photochemical_Decomposition_of_Gaseous_Chlorine_Dioxide.htm (Abstract only in Chinese).

Cheng, J.: "Experimental Study on the Removal of Formaldehyde", Science-Engineering (A), China's Masters Theses Full-Text Database, No. 7, Apr. 10, 2015, 68 pages (w/ English Abstract and cited in International Search Report).

Cui, C., et al: "Research on Photochemical Decomposition of Gaseous Chlorine Dioxide", China Safety Science Journal Zhongguo Anquan Kexue Xuebao 2011, Issue 7, pp. 52-56 (w/ English Abstract and cited in International Search Report).

\* cited by examiner

CATALYST FOR DISINFECTION, STERILIZATION AND PURIFICATION OF AIR, AND PREPARATION METHOD THEREOF

TECHNICAL FIELD

This invention relates to the field of green chemistry advanced oxidation technology and environmental engineering application, particularly, it relates to the generation of large amount of free radicals such as OH, .ClO$_2$, .HO$_2$, and .O in the gas phase and the initiation of chain reaction.

BACKGROUND

The microbial contaminants and chemical pollutants in air can be cleaned by the way of adsorption, photocatalysis, anion, plasma, and ozone etc. Of these methods, purification by utilizing high concentration of ozone is considered to be the most effective. The standard electrode potential of ozone is 2.07 volt, and the chemical reaction rate constant is $10^1 \sim 10^2$ L/(mol·s). In its gas phase, ozone can eliminate mold (one of the microbiological contamination that is relatively difficult to eliminate) within 100 minutes, but ozone purification has its shortcomings. Ozone is harmful to humans, hence man-machine coexistence cannot be realized during the disinfection and the purification process. Meanwhile, .OH has stronger oxidizing ability (with a standard electrode potential of 2.80 volt), almost has the same oxidizing ability as the elemental fluorine (with a standard electrode potential of 2.87 volts), and thus is a very strong oxidizing substance. Meanwhile, the .OH reaction is a kind of free-radical reaction, and has a very high chemical reaction rate of $10^7 \sim 10^9$ L/(mol·s), and can react seven order of magnitude faster than ozone. The chemical reaction time is less than 1 second, and the biochemical reaction time is between 1 to 10 seconds. However, as .OH is very short-lived (only around 10 nano seconds), the generation of .OH and the pollution purification should proceed at the same time. It means that the in situ regeneration of high concentration of free radicals in gas phase or mass generation of free radicals in gas phase such as .OH, .ClO$_2$, .HO$_2$ and .O need to be achieved.

The surface of silica is highly hydrophilic, and water molecule can be reversibly or irreversibly adsorbed on the surface. Hence the surface of silica is normally covered with a layer of OH (Hydroxyl group) and water molecules. The former mentioned hydroxyl group binds to the Si atoms on the surface which is chemically adsorbed. The latter mentioned water molecule is adsorbed on the surface physically. Based on a large amount of experimental data, through long time observation as well as theoretical analysis, this characteristic of silica helps us in achieving the goal of mass generation of free radicals in gas phase, such as .OH, .ClO$_2$, .HO$_2$ and .O. When silica is loaded with stabilized chlorine dioxide solution, then dehydrated at a temperature under 85° C., in the absence of light or heat, ClO$_2$ can cause the physically adsorbed water layer (in small amount) on the silica surface to go through ionized hydrolysis, H$_2$O—H$^+$+OH$^-$, and the following hydrolysis can take place ClO$_2$+H$_2$O—HClO$_2$+HClO$_3$. Other than this hydrolysis, there also exists nonionic chemical hydrolysis as following,

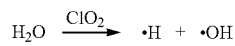

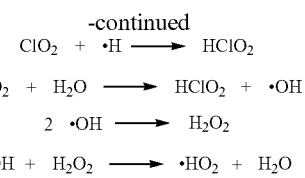

The above nonionic chemical hydrolysis (in the pattern of free radicals) is not significant in general, however, at the presence of physical or chemical catalyst or the presence of substrate that can react with it, the reaction rate can be accelerated greatly, and large amount of .OH can be generated,

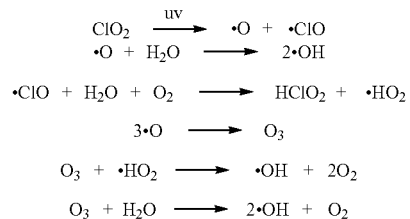

As the surface of active aluminium oxide is also covered with a layer of OH generated by the water adsorbed, it has the same characteristic as the aforementioned silica.

Advanced oxidation technology is marked by the production of .OH. However, current methods of generating gas phase .OH, such as patent No. CN201010567135.8 and patent No. CN201310700249.9, require additional equipment and the cost is very high, thus make them difficult to be used in large scale industrial production.

BRIEF DESCRIPTION

This invention aims to solve the technical deficiency of the existing advance oxidation technology in gas phase, in the field of air disinfection and purification under the gas phase, and provides a new method to generate mass free radicals in gas phase, such as .OH, .ClO$_2$, .HO$_2$ and .O for air disinfection and purification. It has achieved the following improvements in practical application, it improves the efficiency of pollutant removal; produces no secondary pollutant; has a long service life; convenient and dependable to use, and achieves the goal of man-machine coexistence.

The first feature of the invention, the catalyst carrier can be selected from several kinds of inorganic porous materials, such as silica, zeolite, sepiolite, diatomite, montmorilionite, and aluminum oxide (with hole density greater than 100 meshes). The particle sizes of 2-3 mm or 3-5 mm are preferred. It can be one of the above compounds or a combination thereof. Dip the compound into stabilized chlorine dioxide solution or stabilized chlorite solution and then dehydrate the compound at a temperature under 85° C., and when the moisture content is lower than 8%, the catalyst carrier is obtained.

The second feature of the invention, the catalyst carrier can also be a structured carrier, using cordierite honeycomb or mullite ceramic honeycomb, (hole density 50 meshes to 900 meshes) preferably 400 meshes, with a size of 150×150 mm. The thickness can be adjusted as needed, preferably 25 mm, 50 mm, 100 mm and 150 mm. Dip the compound into stabilized chlorine dioxide solution or stabilized chlorite solution, dehydrate at a temperature under 85° C., when the moisture content is lower than 8%, the catalyst carrier is obtained.

The material can be used in two ways: the first way, after Ultraviolet irradiation, active radical particles such as .OH, .ClO$_2$, .HO$_2$ and .O can be generated, chain reaction will be initiated, these active particles can quickly eliminate virus, bacteria and mildew and degrade chemical contaminant. The final products are carbon dioxide, water and trace of mineral salt; the second way, based on the differences of environments and objectives, the process of Ultraviolet irradiation can be omitted. Directly as a catalytic oxidation material, elimination of virus, bacteria, and mildew as well as other chemical contaminants can also be achieved, only the purification efficiency is slightly lower than the first way. To achieve the same effect, 30% more catalyst is needed when Ultraviolet irradiation is not used.

There are two schemes for the impregnation solution in this invention

Scheme 1: Prepare stabilized chlorine dioxide solution, using high-purity chlorine dioxide generator to obtain chlorine dioxide gas with purity higher than 98%. Use sodium carbonate peroxyhydrate (chemical formula: Na$_2$CO$_3$.mH$_2$O$_2$.nH$_2$O) as stabilizer agent, prepare a specific ratio of absorption solution, and a solution with chlorine dioxide content of 2% to 5% is obtained.

Scheme 2: Prepare stabilized sodium chlorite solution, the solution comprises the following compound: Chlorite 0.1-10%; Stabilizer agent 0.1-5%; Buffer agent 0.05%-15%; Absorbers 0.1-75%.

Chlorite refers to chemical salt with chlorite ion ClO2$^-$, such as sodium chlorite, potassium chlorite, and lithium chlorite.

Stabilizer solution is also a strong oxidant, for example: potassium permanganate, hydrogen peroxide, perchlorate, nitrate etc.

Buffer solution refers to the chemical which can maintain the basic balance of the pH value in a solution within a certain range, and generally is a salt. Here, salts formed by strong base and weak acid, for example: sodium carbonate, borate or citrate can be used.

Absorber refers to a type of chemical absorbent. It reacts with the solute. The solubility of the solute relates not only to the vapor-liquid equilibrium, but also to the chemical equilibrium. Most chemical absorbent is a solution with certain type of active ingredient, such as potassium carbonate, sodium carbonate, sodium hydroxide, and potassium hydroxide solutions in water.

Using either of the two impregnation solutions as described above, impregnating any inorganic porous catalyst carrier aforementioned, performing dehydration at a temperature under 85° C. till moisture content ≤8%, the catalyst as mentioned in this invention can be obtained.

All of the three wave band A, B and C (wavelength 180 nm-400 nm) in UV lamp could activate this catalyst material to produce mass free radicals in gas phase, such as .OH, .ClO$_2$, .HO$_2$ and .O. So long as the power density is the same, the result is about the same using either LED UV lamp or mercury UV lamp. For central air supply filter system, the catalyst produced with honeycomb ceramics as carrier (low air resistance) in combination with C wavelength UV irradiation (185 nm), where ozone would be generated, could achieve the best disinfection and purification results.

When the air humidity is high, (e.g. >80%), the pollutant removal efficiency of conventional photocatalytic oxidation technology or room temperature heterogeneous catalytic oxidation technology is significantly declined. Yet the catalyst as described in this invention would not be impacted by high air humidity, especially in daily life, where the air humidity over 80% is quite often. When the air is very dry, with a concentration of water below 4%, the pollutant removal efficiency of the invention will be greatly impacted, however, this extreme dryness in the air rarely occur.

DETAILED DESCRIPTION

Figure 1:
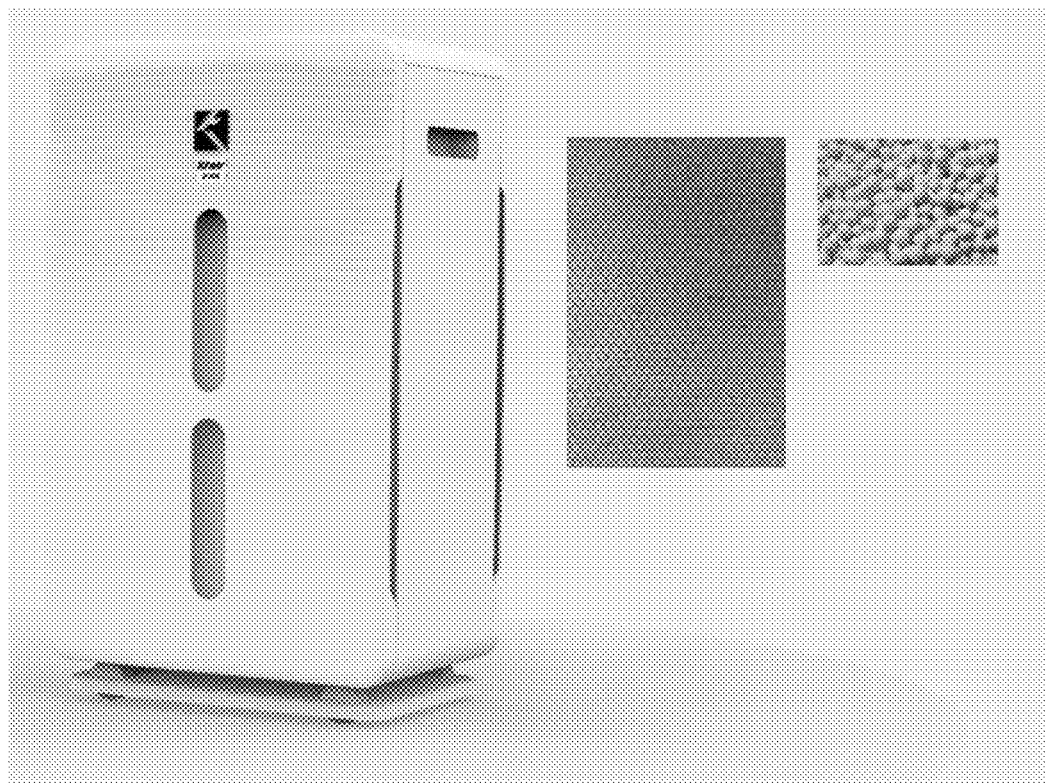
FIG. 1 is a view of a test prototype KF-501A installed with the catalyst of this invention.

First, stabilized sodium chlorite solution was prepared, 5000 ml of purified water was measured, 400 g sodium chlorite with 80% purity was weighed and dissolved in water. Then, weigh 100 g sodium chloride was weighed and added in the solution, stirred till fully dissolved. Then 20 g sodium borate tetrahydrate was added, and 20 ml 30% hydrogen peroxide was added. The solution was filtered after stirring. Finally, the pH value was adjusted to the range between 8.0 and 9.5 with sodium carbonate. Then 3000 g silica with particle size between 3-5 mm was added and fully immersed into the solution, stirred for 1 to 2 hours, the remaining liquid was filtered, the catalyst was blown dry and then heated dry at 65° C. in a vacuum furnace till moisture level ≤8%. After cooling, the material can be used to make two air filters that are assembled in a double-sided inlet air disinfection purifier KF-501A. This purifier is not equipped with UV lamp, and the air filters are used in conjunction with H13HEPA air filter for indoor air purification, as shown in FIG. 1.

EXAMPLE 2

Figure 2:
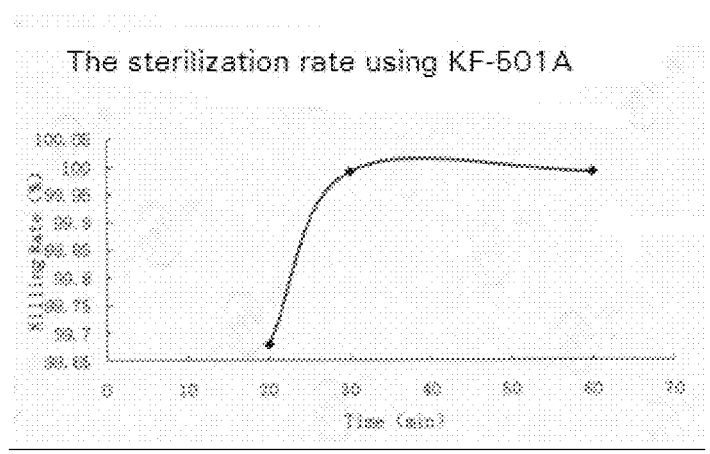
FIG. 2 shows the sterilization rate using KF-501A.

Third party testing data for sterilization rate of the air disinfection purifier of example 1 is shown in FIG. 2, the test is carried out in a 30 m$^3$ test chamber, and the results are recorded in the table below.

TABLE 1

| | | | Control group | | | Test group | | |
| --- | --- | --- | --- | --- | --- | --- | --- | --- |
| | | | | | | | | Date Received: Nov. 3, 2014 |
| | | | | | | | | Date Analyzed: Nov. 3, 2014 |
| | | | | Test results | | | | |
| Number of Sample | Test Bacteria | Test Time (min) | Original Bacteria Count $V_0$ (cfu/m$^3$) | Bacteria Count after Treatment $V_1$ (cfu/m$^3$) | Natural decay rate $N_1$ (%) | Original Bacteria Count $V_1$ (cfu/m$^3$) | Bacteria Count after Treatment $V_2$ (cfu/m$^3$) | Killing Rate $K_1$ (%) |
| WJ20144913-1 | *Staphylococcus albus* | 20 | 1.82 × 10$^5$ | 1.67 × 10$^5$ | 8.24 | 1.76 × 10$^5$ | 5.21 × 10$^2$ | 99.68 |
| | | 30 | 1.82 × 10$^5$ | 1.58 × 10$^5$ | 13.19 | 1.76 × 10$^5$ | 17 | 99.99 |
| | | 60 | 1.82 × 10$^5$ | 1.43 × 10$^5$ | 21.43 | 1.76 × 10$^5$ | <7 | >99.99 |

As can be concluded form FIG. 2, using the air disinfection purifier of example 1, the killing rate of *Staphylococcus albus* can be as high as 99.68% after 20 min test time.

EXAMPLE 3

Third party testing data for removal rate of the air pollutants using the purifier of example 1 is tested, the test is carried out in a 30 m$^3$ test chamber, under a temperature of $(25\pm2)°$ C. and a humidity of $(50\pm10)\%$ RH.

The test procedure is as follows:

(1) The air purifier (test prototype) is place in the middle of the test chamber according to the requirements of GB/T 18801-2008. The air purifier is adjusted to the working state. Turn off the air purifier after checking that the machine is working properly.

(2) Start the temperature and humidity control device to keep the chamber temperature in the range of 23-27° C., and the relative humidity in the range of 40-60% RH.

(3) A certain amount of gaseous pollutant is added into the chamber by using the gaseous pollutant generator. The generator is closed when the initial concentration reach 8-12 times of the corresponding limitation of GB/T 18883-2002.

(4) The fan of the test chamber is opened to stir the gaseous pollutant for 10 min, and then closed after evenly mixed.

(5) The initial concentration of sample is collected after the fan stop working.

(6) The air purifier is re-opened after the sample has been collected, and a one hour sample is collected after an hour.

(7) The natural decay of pollutants is tested using the same method as mentioned above as control, with the air purifier kept closed.

The calculating formulas and the test results are recorded in the table below.

| | | | Control Group | | | Test Group | | |
| --- | --- | --- | --- | --- | --- | --- | --- | --- |
| | | | | | | | | Test Results |
| Number of Sample | Pollutant | Test Time (h) | Original concentration on $C_0$ (mg/m3) | Final concentration $C_1$ (mg/m3) | Natural decay rate $N_1$ (%) | Original concentration $C_0$ (mg/m3) | Final concentration $C_1$ (mg/m3) | Total decay rate $N_1$ (%) | Removal rate $K_1$ (%) |
| WJ20144913-1 | Formaldehyde | 1 | 1.05 | 1.00 | 4.8 | 1.15 | 0.01 | 99.1 | 99.1 |

Natural decay rate
$$N_t'(\%) = \frac{C_0' - C_t'}{C_0'} \times 100$$

where: $C_0$ = the original concentration of control group; $C_1$ = the final concentration of control group Total decay rate
$$N_t(\%) = \frac{C_0 - C_t}{C_0} \times 100$$

where $C_0$ = the original concentration of test group; $C_1$ = the final concentration of test group Removal rate
$$K_t(\%) = \frac{C_0 \times (1 - N_t') - C_t}{C_0 \times (1 - N_t')} \times 100$$

Figure 3:
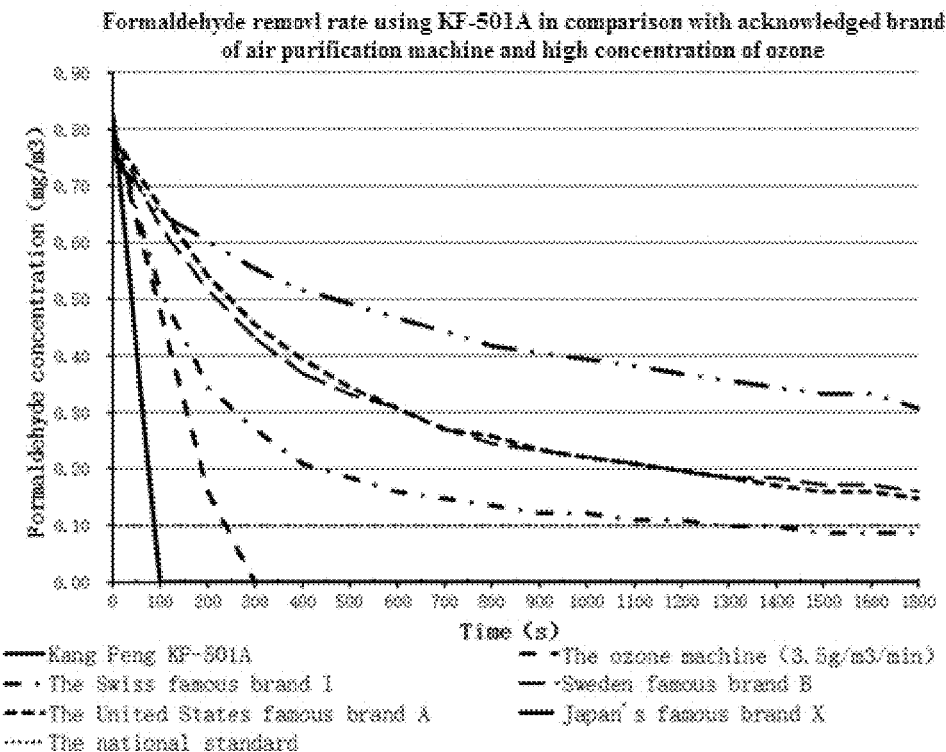
FIG. 3 shows the formaldehyde removal rate using KF-501A in comparison with acknowledged brand of air purification machine and high concentration of ozone.

Formaldehyde removal rate curve comparison between KF-501A and other international well-known air purifier brand in a 10 m$^3$ test chamber is shown in FIG. 3.

Figure 4:
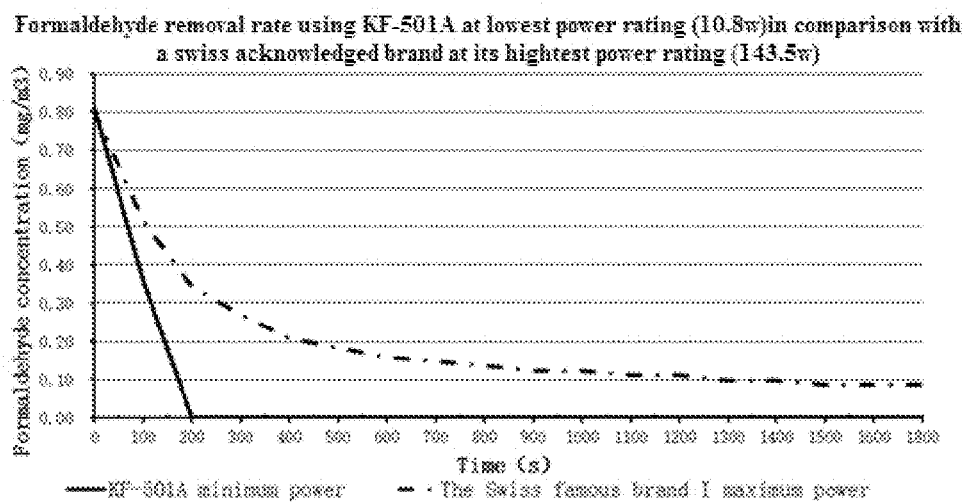
FIG. 4 shows formaldehyde removal rate using KF-501A at lowest power rating in comparison with a Swiss acknowledged brand at its highest power rating.

Formaldehyde removal rate curve comparison between KF-501A operates at its lowest power rating and a Swiss acknowledged air purifier brand operates at its highest power rating in a 10 m3 test chamber is shown in FIG. 4.

The invention claimed is:

1. A catalyst for disinfection, sterilization and purification of air, the catalyst comprising a porous inorganic catalyst carrier, the porous inorganic catalyst carrier comprising one or more of aluminum oxide, silica, zeolite, sepiolite, montmorillonite, and diatomite, having a density greater than 100 meshes; wherein
   the catalyst is capable of generating free radicals in gas phase comprising OH, .ClO$_2$, .HO$_2$ and .O, which absorb and oxidize viruses, bacteria, fungi and other microorganisms in the air, and clear formaldehyde and other chemical containments by oxidation, and
   the porous inorganic catalyst carrier has a specific surface area greater than 10 m$^2$ per gram.

2. The catalyst according to claim 1, wherein the porous inorganic catalyst carrier is impregnated in a stabilized chlorine dioxide solution or a stabilized sodium hypochlorite solution, and the catalyst is formed after the carrier is dried at a temperature lower than 85° C.

3. The catalyst according to claim 2, wherein the porous inorganic catalyst carrier is a structured carrier having a hole density between 30 mesh and 900 mesh.

4. The catalyst according to claim 3, wherein the hole density of the porous inorganic catalyst carrier is 400 mesh.

5. The catalyst according to claim 3, the porous inorganic catalyst carrier adopts cordierite or mullite ceramic honeycomb.

6. The catalyst according to claim 2, wherein the stabilized chlorine dioxide solution is prepared by the following procedures: obtaining chlorine dioxide gas having a purity over 98% by using a purified chlorine dioxide generator, preparing an absorbing liquid by using sodium carbonate peroxyhydrate as a stabilizer, and preparing a solution having a chlorine dioxide content of 2%-5%.

7. The catalyst according to claim 2, wherein the stabilized chlorite solution comprises: a chlorite 0.1-10%; a stabilizer solution 0.1-5%; a buffer solution 0.05-15%; absorbers 0.1-75%; and the chlorite is an alkali metal salt or alkaline metal salt of chlorous acid.

8. The catalyst according to claim 7, wherein the chlorite is sodium chlorite, potassium chlorite, or lithium chlorite.

9. The catalyst for disinfection, sterilization and purification of air according to claim 2, wherein the catalyst is irradiated by ultraviolet.

10. A disinfection and purification method using the catalyst of claim 1, wherein the catalyst is pre-processed into a certain shape; when the catalyst is placed on the microenvironment of air filtration system or portable air disinfection and purification equipment, after it is activated by ultraviolet having a density greater than 30 mW/cm$^2$, microbial contaminants and chemical pollutants are removed.

11. The disinfection and purification method according to claim 10, wherein the ultraviolet is provided by either a mercury UV lamp or an LED UV lamp.

12. The catalyst for disinfection, sterilization and purification of air according to claim 1, wherein the catalyst is irradiated by ultraviolet.

13. The catalyst for disinfection, sterilization and purification of air according to claim 1, wherein, the porous inorganic catalyst carrier has a specific surface area greater than 100 m$^2$ per gram.

14. The catalyst according to claim 13, wherein a particle size of the porous inorganic catalyst carrier is 2-3 mm.

15. The catalyst according to claim 13, wherein a particle size of the porous inorganic catalyst carrier is 3-5 mm.

* * * * *